United States Patent [19]
Alsenz

[11] Patent Number: 5,079,929
[45] Date of Patent: Jan. 14, 1992

[54] MULTI-STAGE REFRIGERATION APPARATUS AND METHOD

[76] Inventor: Richard H. Alsenz, 2402 Creekmeadows, Missouri City, Tex. 77459

[21] Appl. No.: 554,264

[22] Filed: Jul. 18, 1990

Related U.S. Application Data

[63] Continuation-in-part of Ser. No. 505,557, Apr. 6, 1990, which is a continuation-in-part of Ser. No. 146,285, Jan. 21, 1988, Pat. No. 4,951,475.

[51] Int. Cl.$^5$ .............................. F25B 5/00; F25B 1/00
[52] U.S. Cl. .......................................... 62/117; 62/175; 62/230; 62/509
[58] Field of Search ............ 62/230, 175, 512, DIG. 17, 62/211, 117, 509

[56] References Cited

U.S. PATENT DOCUMENTS

| | | | |
|---|---|---|---|
| 3,018,640 | 1/1962 | Heller et al. | 62/335 |
| 3,848,422 | 11/1974 | Schibbye | 62/84 |
| 4,435,962 | 3/1984 | Mochizuki et al. | 62/175 |
| 4,787,211 | 11/1988 | Shaw | 62/175 X |
| 4,803,848 | 2/1989 | LaBrecque | 62/183 |
| 4,815,298 | 3/1989 | Van Steenburgh, Jr. | 62/509 X |
| 4,862,702 | 9/1989 | O'Neal | 62/DIG. 17 |
| 4,910,972 | 3/1990 | Jaster | 62/335 |
| 4,918,942 | 4/1990 | Jaster | 62/335 |

*Primary Examiner*—William E. Wayner

[57] ABSTRACT

This invention provides a multi-staged refrigeration system which includes a method for optimizing the energy used by measuring the energy used by the compressors and increasing the intermediate pressure if the energy decreases when increasing the pressure and decreasing the pressure if the energy increases when increasing the pressure.

21 Claims, 3 Drawing Sheets

MULTI-STAGE REFRIGERATION APPARATUS AND METHOD

CROSS-REFERENCE TO RELATED APPLICATIONS

This application is a continuation-in-part application to co-pending U.S. patent application Ser. No. 505,557, filed Apr. 6, 1990, which is a continuation-in-part of U.S. patent application Ser. No. 146,285, filed Jan. 21, 1988, now U.S. Pat. No. 4,951,475.

BACKGROUND OF THE INVENTION

1. Technical Field

This invention relates to a refrigeration system and more particularly to an apparatus and method for improving refrigeration system efficiencies with improved staging of a multi-stage refrigeration sytem.

2. Description of Prior Art

It has been known in the art of refrigeration systems that the net refrigerating effect in a refrigeration system can be improved by producing subcooling of the liquid refrigerant. Subcooling the refrigerant means that further energy is taken out of the liquid refrigerant and as a consequence it does not have to be removed by the expansion process in the cooling evaporator, thus improving the overall efficiency of the refrigeration system. As an example, it has been known that when a refrigerant leaving a condenser of a refrigeration system has been accumulated in a reservoir, it can then be circulated in the liquid form through another cooling section to produce subcooling of the refrigerant at a small additional operating cost. This method, however, requires an increased amount of refrigerant, which is undesirable.

In a refrigeration system, it is typical to equip a condenser with a flood control means to elevate the condensing pressure of the refrigeration system during low ambient temperatures by reducing the effective condenser surface that is available for condensing. This is accomplished by partially filling (flooding) the condenser with the liquid refrigerant when the condensing pressure is not sufficient. Such systems necessarily required increasing amounts of excess refrigerant to accomplish this flooding technique as the ambient temperature drops. This results in the use of additional refrigerant which is undesirable because commonly used refrigerants contain Chloro-Fluoro-carbons ("CFCs") which are harmful to the environment because they deplete the ozone layer in the upper atmosphere. The additional refrigerant used in such systems is generally lost when a leak occurs, which happens on the average several times over the life of a refrigeration system. This extra refrigerant usage may dramatically increase the amount of leakage of CFCs from refrigeration systems.

Refrigeration systems currently available also attemp to maximize the subcooling effect during the colder periods of the year, i.e., at lower ambient temperatures. One such system is described in U.S Pat. No. 4,831,835, which performs subcooling during periods of low ambient temperature by utilizing a relatively complicated valve arrangement. This system, however, ignores the subcooling at some ambient temperatures. It should be noted that subcooling of a refrigerant to a temperature that is closer to the ambient temperature of the refrigeration system will improve efficiency at all times of the year. Thus, subcooling within the condenser itself at all times, i.e., at all ambient temperatures, is a desirable feature to have in a refrigeration system.

U.S. Pat. No. 4,621,505 also discloses means for improving the subcooling effects during low ambient conditions. With respect to subcooling at higher ambients, this patent suggests that in summer operations when the ambient temperature is above 85 to 90 degrees Fahrenheit, the condensation temperature and head pressures will be higher and little or no economic benefit can be expected. The need to benefit from subcooling has been known for some time in the refrigeration industry; however, to date, no method for achieving subcooling in a condenser at all ambient temperatures (high or low) appears to have succeeded in the marketplace.

Another type of a subcooling system is disclosed in U.S. Pat. No. 4,136,528. It describes a system which provides subcooling to a degree that is sufficient to ensure that the expansion valves operate properly in colder ambient conditions. This system, too, fails to provide subcooling during summer to obtain energy savings.

The prior art systems which utilize subcooling in the condenser have failed to recognize the necessity of holding the refrigerant in the liquid state for some time before allowing it to leave the condenser. In order to make thermal expansion valves function, hold-back valves have been used in the condensate line leaving the condenser to elevate the condensing pressure during low ambient conditions. This method produces liquid subcooling when the condenser is flooded. The hold-back valves used for this purposes have throttling ranges from fully open to fully closed of 20 to 60 psi which means that an additional inefficiency due to higher condensing pressures during higher ambient and higher flow conditions is introduced.

The CFC problem exists with the commonly used refrigerants R502 and R12, but is greatly diminished with refrigerant R22. Single stage low temperature refrigeration systems using the refrigerant R22 are relatively inefficient. This has led the industry to return to a practice of using two-stage refrigerant R22 low temperature systems. The typical two stage system consists of a low temperature compression stage (withits own low temperature suction loads) which discharges the refrigerant into the suction of a second compression stage with generally has additonal higher temperature refrigeration suction loads. In such two-stage systems, the inter-stage pressure, i.e., the discharge pressure of the first stage, which is the suction pressure of the second stage, is the most efficient operation. The prior art systems do not take advantage of this fact. These two-stage refrigeration systems require that the disccharge gas from the first stage must be cooled before compressing it in the second stage.

The present invention addresses many of the above noted problems and provides a more efficient multi-stage refrigeration system in which the liquid refrigerant is subcooled in the condenser at all ambient temperatures.

SUMMARY OF THE INVENTION

This invention provides for a closed loop refrigeration system which contains at least two compression stages. The system includes a reservoir for evaporating and holding a refrigerant at an intermediate or reservoir pressure, an evaporator for evaporating the liquid refrigerant from the reservoir to a low pressure, a first compression stage for compressing the low pressure refrigerant to the intermediate pressure, a second compression stage for compressing the refrigerant from the reservoir pressure to a high condenser pressure, condenser for condensing the high pressure refrigerant to a liquid state, a control valve for controllably discharging the liquid refrigerant into the reservoir, and a control system for controlling various elements and functions of the refrigerant system.

To provide subcooling of the liquid refrigerant in the condenser, the control system causes the liquid refrigerant flow from the condenser through the control valve to increase when the temperature difference between the temperature of liquid refrigerant leaving the condenser and the ambient air temperature entering the condenser is less than a predetermined value, and causes the flow to decrease when the temperature difference is greater than the predetermined value. This method maintains a maximum degree of subcooling with minimal flooding of the condenser.

Additionally, the control system continually adjusts (up or down) the intermediate pressure to a level at which the engery used by the system is minimum.

In an alternate embodiment, the above system may also include a second evaporator connected to the reservoir for evaporating the liquid refrigerant to a medium pressure, which is greater than the low pressure, and a compressor for compressing the refrigerant from the medium pressure to the high condenser pressure and discharging it to the condenser.

Examples of the more important features of the invention thus have been summarized rather broadly in order that the detailed description thereof that follows may be better understood, and in order that the contribution to the art may be better appreciated. There are, of course, additional features of the invention that will be described hereinafter and which will form the subject of the claims appended thereto.

DESCRIPTION OF THE DRAWINGS

For detailed understanding of the present invention, reference should be made to the following detailed description of the preferred embodiment, taken in conjunction with the accompanying drawings, in which like parts are given like reference numberals and wherein.

DESCRIPTION OF PREFERRED EMBODIMENTS

The refrigeration system of the invention includes at least two compression stages. In the first stage, a gaseous refrigerant is compressed by a first compressor from a low pressure $P_1$ to an intermediate pressure $P_i$, and in the second stage, the gaseous refrigerant is compressed by a second compressor from the intermediate pressure $P_i$ to a high condenser $P_h$. Additional compression stages may also be added into the system. For example, a third compression stage may be added, in which gaseous refrigerant is compressed by a third compressor from a medium pressure $P_m$ to the high condenser pressure $P_h$. In either case, the high pressure refrigerant is condensed to a liquid in a condenser at the high pressure $P_h$.

Electronic subcooling control is provided at the condenser by monitoring the temperature difference between the subcooled liquid leaving the condenser and the ambient air entering the condenser and reducing the flow of the liquid refrigerant out of the condenser by means of a flow control valve if the temperature difference is greater than a predetermined value, and increasing the flow if the temperature difference is less than the predetermined value. This allows maximum degree of subcooling with minimal flooding of the condenser.

The liquid refrigerant leaving the condenser is collected in a reservoir and evaporated with the aid of the second (enthalpy) compressor which compresses the gaseous refrigerant from the reservoir (intermediate) pressure to the condenser pressure $P_h$. This allows engergy to be taken out of the liquid refrigerant, i.e., lower the enthalpy of the liquid. The enthalpy compressor is much more efficient at removing the energy than the other compressors used in the system. This is principally due to the lower compression ratio of the enthalpy compressor.

Figure 1:
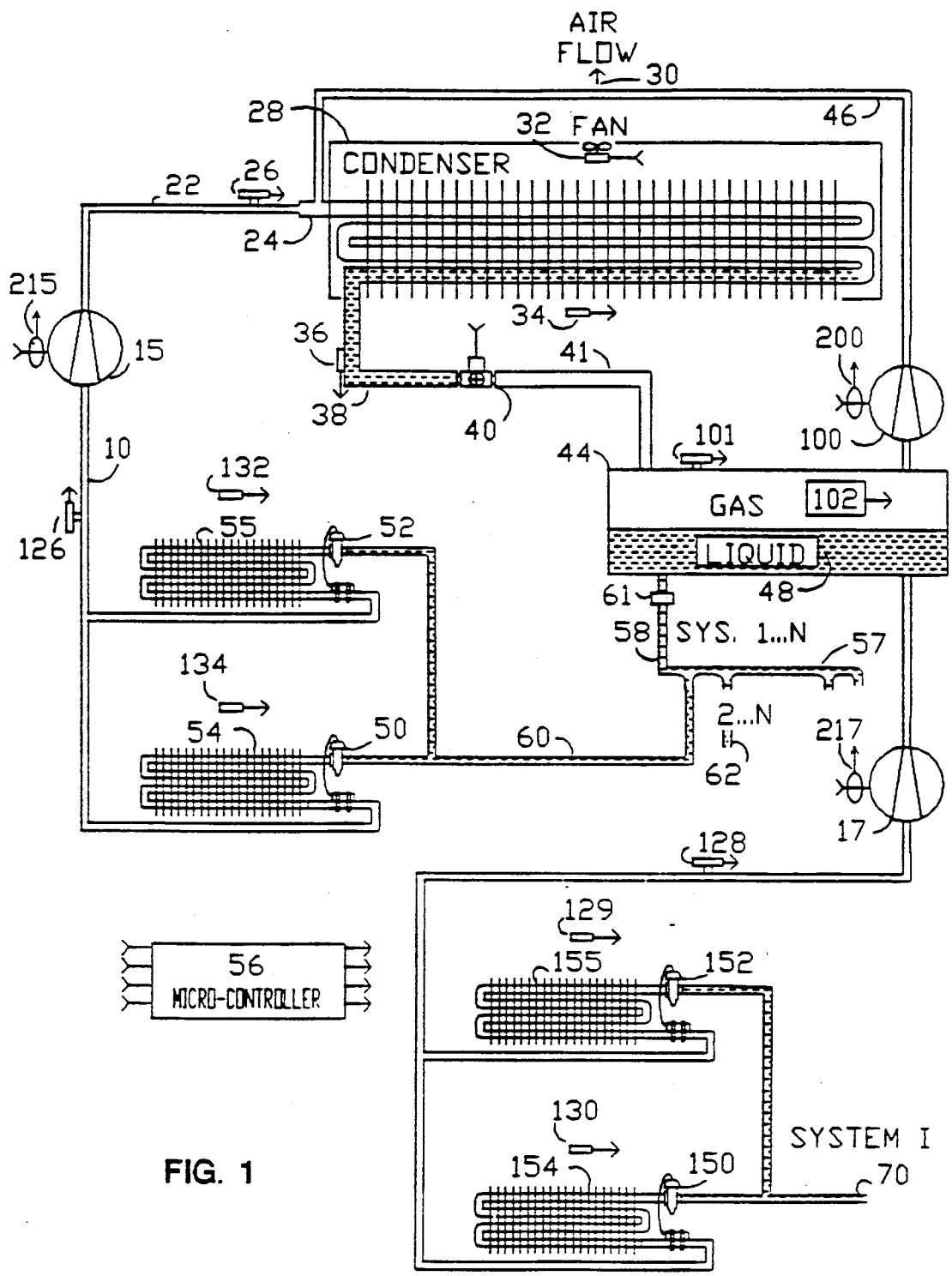
FIG. 1 depicts a multi-stage refrigeration system embodying the invention.

FIG. 1 shows a closed loop refrigeration system having three compression stages. In this system, a vapor refrigerant at a medium pressure $P_m$ is passed into a medium temerature compressor 15 via a refrigerant tube 10. The medium temperature compressor 15 compresses the refrigerant to a high pressure $P_h$ gaseous state and discharges it through refrigerant tubes 22 and 24 into a condenser 28. The gaseous refrigerant is condensed into a liquid by circulating air across the condenser 28 by a fan 32. A termperature sensor 34 is installed to measure the temperature of the ambient air entering the condenser 28. A pressure transducer 26 is installed in the refrigerant tube 24, which provides an electrical signal that is representative of the pressure of the gases in the refrigerant tube 24 to a micro-controller circuit 56.

Still referring to FIG. 1, the micro-controller circuit 56 contains a microprocessor and other circuitry including memory, analog to digital converter, comparators, and switching circuitry for switching output loads. The micro-controller circuit 56 acquires information from various sensors used in the refrigeration system (such as sensors 26, 36, 101, 102, 126, 129, 130, 132, 134 and the like), and processes these signals to control a variety of elements and function of the refrigeration system. The output switches are represented by outwardly pointing arrows and inputs are represented by inwardly pointing arrows on the micro-controller circuit 56. Sensors are shown with outwardly pointing arrows signifying that they are electrically connected to and supply information to the micro-controller circuit 56. System elements, such as the compressors 15, 17 and 100, control valve 40, have inwardly pointing arrows signifying that information is delivered from the micro-controller circuit 56 to those elements.

Still referring to FIG. 1, the condensed (liquid) refrigerant leaves the condenser 28 through a liquid return line 38. A temperature sensor 36 is installed on the liquid return line 38, which measures the temperature of the liquid refrigerant and provides a corresponding signal to the micro-controller circuit 56. A flow control valve 40 is installed in the liquid return line 38, which controllably discharges the liquid refrigerant from the liquid line 38 into a main liquid reservoir 44 through a main tube 41. The operation of the control valve 40 is controlled by the microcontroller circuit 56. A sensor 34 is placed near the condenser to provide an electrical signal to the micro-controller 56 which is representative of the ambient temperature.

Figure 2:
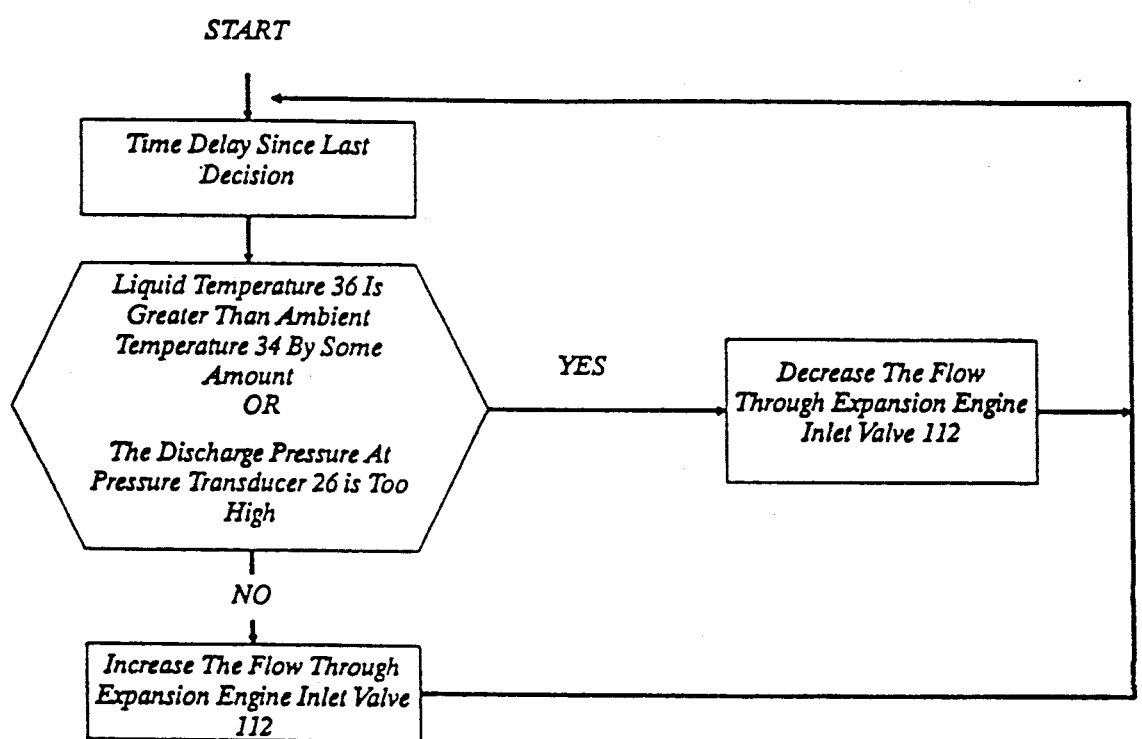
FIG. 2 depicts an algorithm for controlling the liquid refrigerant flow through a control valve.

The sequence and the method used to control the operation of the control valve 40 will now be described in more detail while referring to FIGS. 1 and 2.

As described earlier, the temperature sensor 36 measures the temperature of the liquid refrigerant leaving the condenser 28 and the temperature sensor 34 measures the ambient air temperature entering the condenser 28. When the refrigeration system is operating, the high pressure gaseous refrigerant from the compressor 15 is cooled in the condenser to condense it into a liquid state. As the refrigerant vapor travels through the condenser 28, it begins to condense into droplets on the inner walls of the condenser pipes. The control valve 40 prevents the flow of the entire liquid refrigerant from the condenser 28 to the reservoir 44, thereby enabling some of the liquid refrigerant to accumulate in the condenser pipe 38. The micro-controller circuit 56 regulates the liquid refrigerant flow through the control valve 40 as a function of the difference between the liquid refrigerant temperature (ascertained by the temperature sensor 36) and the ambient temperature (ascertained by the temperature sensor 34). When the temperature difference between the liquid refrigerant temperature and the ambient temperature ("$\Delta t$") is greater than a predetermined value, the micro-controller 56 deceases the flow through the control valve 40. On the other hand, when the temperature difference $\Delta t$ is less than the predetermined value, the micro-controller increases the flow through the control valve 40. A time delay between successive decisions to alter the flow through the control valve is programmed into the micro-controller to smooth out the operation of the control valve. In practice, the micro-controller is programmed to regulate the liquid refrigerant flow through the control valve so as not to fill the condenser excessively, because that will increase the liquid refrigerant pressure at the sensor 26, which in turn will decrease the system efficiency. The above described decision making process is illustrated in the flow chart of FIG. 2. The operation or the method described above ensures that during operaiton there is always maintained an amount of liquid refrigerant in the condenser which is sufficient to provide subcooling of the liquid refrigerant before it is discharged into the reservoir 44. The liquid refrigerant flow through the control valve may be controlled by either pulse modulating or analog modulating the flow control valve 40. It is desirable not to let the flow through the condenser stop completely because that can result in loss of control. This can be accomplished, in the case of a pulse modulated control valve, by providing a minimum pulse width or a minimum duty cycle. In summary, the continuous flooding of the condenser by controlling flow through the control valve 40 provides subcooling of the liquid refrigerant in the condenser at all ambient temperatures, which increases the efficiency of the refrigeration system.

Referring back to FIG. 1, the liquid refrigerant from the reservoir 44 is pumped by means of a pump 61 through a tube 58 into a liquid manifold system 57 where it enters a liquid tube 60 connected to expansion valves 50 and 52. Expansion valves 50 and 52 are connected to separate evaporators 54 and 55. These evaporators form a single temperature refrigeration system wherein the expansion valves 50 and 52 meter the liquid refrigerant into evaporators 54 and 55 respectively. Similarly, other refrigeration sytems (not shown) may be connected to the liquid manifold system 57 through tubes 62 and the like. When the liquid refrigerant is metered through the expansion vales 50 or 52, it evaporates into a gaseous state within its respective evaporator at medium pressure $P_m$ and a low temperature. The gaseous refrigerant is passed to the medium temperature compressor 15 through the suction refrigerant tube 10, which compresses the gaseous refrigerant to the condenser pressure $P_h$, thus completing a refrigerant cycle for the evaporators 54 and 55. This refrigerant cycle is continuously repeated during operation.

Still referring to FIG. 1, a low temperature evaporator system, System I containing evaporators 154 and 155, is connected to the reservoir 44 via the liquid manifold system 57. These evaporators form a single temperature refrigeration system. Liquid refrigerant from the reservoir 44 is fed to the evaporators 154 and 155 through a pipe 7. Expansions valves 150 and 152 meter the liquid refrigerant to the evaporators 154 and 155 respectively. The liquid refrigerant is evaporated to a low pressure $P_l$ gaseous state, $P_l$ being less than $P_m$. The low pressure $P_l$ gas is then compressed to the intermediate reservoir pressure $P_i$ by a compressor 17 connected to the outlets of the evaporators 154 and 155 and is either discharged into the reservoir 44 or directly passed on to the enthalpy compressor 100.

Thus, System I operates in a manner similar to the evaporator system of evaporators 54 and 55, but (1) it maintains a lower pressure $P_l$ in the evaporators 154 and 155 than the medium pressure $P_m$, and (2) the gaseous refrigerant from the evaporators 154 and 155 is compressed to the intermediate pressure $P_i$ instead of to the higher condenser pressure $P_h$. The compressed refrigerant enters the bottom of reservoir 44 and is cooled. It is then compressed by the enthalpy compressor 100 to the high condenser pressure $P_h$ and discharged into the condenser 28.

The refrigeration system of FIG. 1 may be further expanded by connecting additional evaporator systems like System I, each such system being adapted to receive liquid refrigerant from the reservoir 44. The evaporated refrigerant from these systems also will be compressed in two stages as described for System I above.

Still referring to FIG. 1, the enthalpy compressor 100 compresses the intermediate pressure refrigerant gas from the reservoir 44 to the condenser inlet, where it is mixed with the high pressure gaseous refrigerant from the compressor 15. This evaporation action removes heat from the liquid refrigerant in the reservoir 44 which reduces the temperature and pressure in the reservoir 44 and, therefore, the enthalpy of the refrigerant in the reservoir, thereby further improving the overall efficiency of the refrigeration system.

The compressor action is controlled by the micro-controller 56, which receives input from a pressure transducer 101 and a liquid level transducer 102, both of which are mounted on the reservoir. Transducer 102 senses the liquid level in receiver 48 and turns off compressor 100 if the level is too high. This also allows for more of the energy to be taken out of the refrigerant by enthalpy compressor 100, which has a higher coefficient of performance than compressors 15 and 17. Since high compression ratios are not of benefit, compressor 100 may be of a scroll or centrifugal type.

The intermediate pressure $P_i$ at reservoir 44 is controlled so as to optimize the efficiency of the system.

Figure 3:
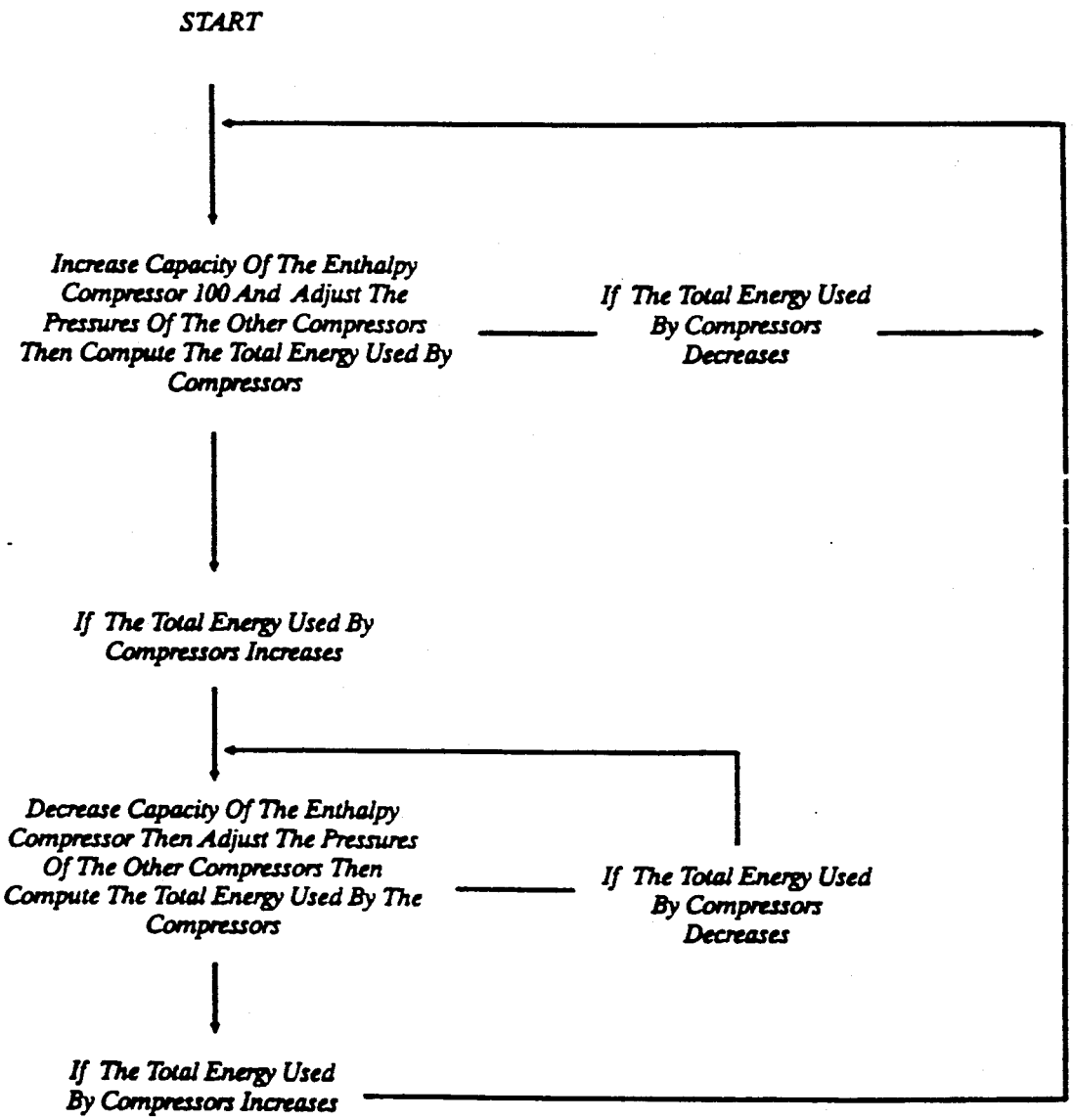
FIG. 3 depicts an algorithm for controlling the intermediate pressure in the multi-stage refrigeration system of FIG. 1.

This is accomplished by monitoring the energy of the compressors with watt transducers 200, 215, and 217 and varying or adjusting the pressure at the reservoir 44 by changing the speed of the compressor 100 in accordance with the algorithm of FIG. 3. According to the logic of algorithm of FIG. 3, the control circuit inceases the speed of the compressor 100 and measures the total energy comsumption of the system. If the energy consumed decrease, the speed of the compressor 100 is further increased until the energy comsumption starts to increase. Similarly, if the compressor speed is decreased and the energy consumption decreases, the speed of the compresser is further decreased until the energy consumption starts to increase. Thus, in short, the intermediate reservoir pressure is continually adjusted to a level at which the energy consumed by the system is the least. This optimization is made possible because the intermediate or reservoir pressure is independent of the temperature of the medium temperature refrigeration stage and, hence, compressor 15. As it will be obvious, the refrigeration system of the invention may be constructed with only two compression stages, i.e., without the compressor 15 and the medium temperature evaporator system. Such a system would be desirable where no medium temperature refrigeration is required.

While the invention has been described in accordance with air cooled condensers, one experienced in the art may easily apply the invention to water or fluid cooled condensers of all sorts. It intended that the current patent shall apply to all sorts of condensers. While the invention has also been described in accordance with single compressors with variable speed, one experienced in the art may easily apply the invention to multiple compressors piped in parallel, compressors with unloaders, compressors with variable speed pulleys and in general compressors with capacity control. It is intended that the current patent should apply to all sorts of compressors with capacity control. These embodiments have not been specifically described because they are considered redundant in application of the invention in view of the above description.

What is claimed is:

1. A method of achieving refrigeration in a closed loop refrigeration system having a reservoir which contains liquid and gaseous refrigerant at a pressure, the method comprising the steps of:
   (a) compressing the gaseous refrigerant from the reservoir to a condensing pressure and discharging the compressed refrigerant into a condenser;
   (b) condensing the refrigerant in the condenser to a liquid and discharging the liquid to the reservoir;
   (c) discharging the liquid refrigerant from the reservoir to an evaporator for evaporating the liquid refrigerant into a gaseous state; and
   (d) compressing the gaseous refrigerant from the evaporator to the reservoir pressure and discharging the compressed refrigerant into the liquid refrigerant contained in the reservoir.

2. A method of achieving refrigeration in a closed loop refrigeration system having a reservoir which contains therein liquid refrigerant at a pressure, the method comprising the steps of:
   (a) discharging the liquid refrigerant into an evaporator through an expansion valve;
   (b) evaporating the refrigerant in the evaporator to a gaseous state;
   (c) compressing the gaseous refrigerant from the evaporator to the reservoir pressure and discharging it into the reservoir;
   (d) compressing the gaseous refrigerant from the reservoir to a condensing pressure and discharging it into a condenser;
   (e) condensing the gaseous refrigerant in the condenser to a liquid;
   (f) determining the temperature difference between the temperature of the liquid refrigerant in the condenser and the ambient temperature; and
   (g) discharging the liquid refrigerant from the condenser to the reservoir as a function of the temperature difference.

3. A method of achieving refrigeration in a closed loop refrigeration system having a reservoir which contains liquid refrigerant at a pressure $P_i$, the method comprising the steps of:
   (a) discharging the liquid refrigerant from the reservoir into an evaporator through an expansion valve and evaporating the liquid refrigerant to a gaseous state at a pressure $P_1$, $P_1$ being less than $P_i$;
   (b) compressing the gaseous refrigerant from the evaporator from a pressure $P_1$ to pressure $P_i$ discharging it to the reservoir;
   (c) compressing the gaseous refrigerant from the reservoir to a high pressure $P_h$, $P_h$ being greater than $P_i$, and discharging it into a condenser;
   (d) condensing the gaseous refrigerant in the condenser to a liquid refrigerant;
   (e) measuring the temperature difference between the liquid refrigerant in the condenser and the ambient temperature;
   (f) discharging the liquid refrigerant from the condenser into the reservoir through an electronically controlled valve which increases the liquidd refrigerant discharge when the temperature difference is less than a predetermined value and decreases the discharge when the temperature difference is greater than the predetermined value so as to maintain a body of liquid refrigerant in the condenser during operation.

4. A method of achieving refrigeration in a refrigeration system having a reservoir which contains a liquid refrigerant at a pressure $P_i$, the method comprising the steps of:
   (a) discharging the liquid refrigerant from the reservoir into a first evaporator and evaporating it to a gaseous state at a pressure $P_1$ where $P_1$ is less than $P_i$;
   (b) discharging the liquid refrigerant from the reservoir into a second evaporator and evaporating it to a gaseous state at a pressure $P_m$, where $P_m$ is between $P_i$ and $P_1$;
   (c) compressing the gaseous refrigerant from the first evaporator to the pressure $P_i$ and discharging it into the reservoir;
   (d) compressing the gaseous refrigerant from the reservoir from the pressure $P_i$ to a condensing pressure $P_h$ and discharging it into a condenser;
   (e) compressing the gaseous refrigerant from the second evaporator from the pressure $P_m$ to the condensing pressure $P_h$ and discharging it into the condenser; and
   (f) condensing the gaseous refrigerant in the condenser to a liquid at pressure $P_h$ and discharging it into the reservoir;

5. A method of achieving refrigeration in a closed loop refrigeration system having a reservoir which contains liquid and gaseous refrigerant therein at a pressure $P_i$, the method comprising the step of:
   (a) discharging the liquid refrigerant into an evaporator and evaporating it to a gaseous state at a pressure $P_i$, where $P_1$ is less than $P_i$;
   (b) compressing the gaseous refrigerant from the evaporator to the reservoir pressure $P_1$;
   (c) compressing the gaseous refrigerant from the reservoir to a condensing pressure $P_h$ and discharging it into a condenser;
   (d) condensing the refrigerant in the condenser to a liquid;
   (e) measuring the temperature difference between the liquid refrigerant in the condenser and the ambient temperature; and
   (f) controllably discharging the liquid refrigerant from the condenser to the reservoir through a control valve, said control valve increasing the liquid refrigerant flow therethrough when the temperature difference is less than a predetermined value and decreasing the flow when the temperature difference is greater than the predetermined value while maintaining a body of liquid refrigerant in the condenser for subcooling it prior to discharging it into the condenser.

6. The method of claim 5, further including the step of continually adjusting the capacity of the second compressor so as to minimize the combined energy consumed by the compressors.

7. A method of achieving refrigeration in a closed loop refrigeration system having a reservoir containing a liquid refrigerant under pressure, comprising the steps of:
   (a) evaporating the liquid refrigerant from the reservoir in a first evaporator system to a first pressure gaseous state;
   (b) compressing the low pressure gaseous refrigerant to the reservoir pressure by a first compressor;
   (c) evaporating the liquid refrigerant from the reservoir in a second evaporator system to a second pressure gaseous state;
   (d) compressing the second pressure and reservoir pressure gaseous refrigerant by second and third compressors respectively to a third pressure gaseous state;
   (e) condensing the gaseous refrigerant at the third pressure to a liquid state in a condenser;
   (f) determining the temperature difference between the temperature of the condensed liquid refrigerant and the ambient temperature; and
   (g) discharging the liquid refrigerant from the condenser through a control valve to the reservoir, said control valve increasing the liquid flow therethrough when the temperature difference is less than a predetermined value and decreasing the liquid flow therethrough when the temperature difference is more than the predetermined value.

8. A method of achieving refrigeration as described in claim 6, further including the steps of controlling the speed of the third compressor so that the energy consumed by the compressors in the system is minimum.

9. A closed loop refrigeration system having a reservoir containing therein liquid and gaseous refrigerant at an intermediate pressure, comprising:
   (a) an evaporator having an inlet and outlet end, the evaporator connected to the reservoir at the inlet end for receiving liquid refrigerant therefrom and expanding it to a low pressure gaseous state;
   (b) a first compressor connected between the reservoir and the evaporator for compressing the low pressure gaseous refrigerant to the intermediate pressure and discharging it into the liquid contained in the reservoir;
   (c) a second compressor having an inlet and outlet end, the inlet end of the compressor connected to the reservoir, the compressor compressing the gaseous refrigerant from the reservoir to a condensing high pressure;
   (d) a condenser having an inlet and outlet end, the inlet end of the condenser connected to the outlet end of the second compressor for receiving high pressure gaseous refrigerant therefrom, the condenser condensing the high pressure gaseous refrigerant into a liquid; and
   (e) a control valve connected between the outlet end of the condenser and the reservoir for controllably discharging the liquid refrigerant from the condenser to the reservoir.

10. The refrigeration system of claim 9 further comprising:
    (a) temperature sensors for generating electrical signals representative of the condenser liquid refrigerant and ambient temperatures; and
    (b) a micro-controller circuit electrically coupled to the sensors for receiving the electrical signals and computing the temperature difference between the liquid condenser and ambient temperatures, the micro-controller circuit also connected to the control valve for controlling the liquid refrigerant flow therethrough, said micro-controller circuit causing the control valve to increase the liquid refrigerant flow therethrough when the temperature difference is below a predetermined value and to decrease the flow when the temperature difference is above the predetermined value.

11. The system of claim 10 wherein the microprocessor is also connected to the second compressor, said micro-controller circuit continually adjusting the capacity of the second compressor so as to maintain the energy consumed by the first and second compressors at a minimum.

12. A refrigeration system having a reservoir which contains liquid and gaseous refrigerant at a pressure $P_i$, comprising:
    (a) a first and second evaporator connected to the reservoir for receiving separate amounts of liquid refrigerant from the reservoir, said first and second evaporators expanding the liquid refrigerant to gaseous refrigerant at pressures $P_1$ and $P_m$ respectively, where $P_l < P_m < P_i$;
    (b) a first and second compressor, each having an inlet and outlet end, the inlet ends respectively connected to the first and second evaporators for receiving gaseous refrigerant from their respective evaporators, said first and second compressors compressing the gaseous refrigerant from their respective evaporators to pressures $P_i$ and a condensing high pressure $P_h$ respectively, where $P_p < P_i$, said first compressor discharging the gaseous refrigerant at pressure $P_i$ to the reservoir;
    (c) a third compressor having an inlet and outlet end, the inlet end of the third compressor connected to the reservoir for receiving gaseous refrigerant from the reservoir and compressing it to the high condensing pressure $P_h$;

(d) a condenser having an inlet and outlet end, the inlet end of the condenser connected to the outlet ends of the second and third compressors, said condenser receiving the gaseous refrigerant from the second and third condensers and condensing it to a liquid; and (e) a flow control valve connected to the outlet end of the condenser and the reservoir for controllably discharging the liquid refrigerant from the condenser to the reservoir.

13. The refrigeration system of claim 9 further comprising a control circuit electrically coupled to both the compressors for continually controlling the capacity of one of the compressors so as to minimize the combined energy consumed by the compressors.

14. The refrigeration system of claim 12, wherein the control circuit is a microprocessor based circuit.

15. The refrigeration system of claim 12 further comprising:

(a) a first temperature sensor connected to the condenser for providing an electrical signal representative of the liquid refrigerant temperature therein;

(b) a second temperature sensor placed near the condenser for providing an electrical signal representative of the ambient temperature; and (c) a control circuit electrically coupled to the first and second temperature sensor, said control circuit determining the temperature difference between the ambient temperature and the condensed liquid refrigerant temperature and causing the control valve to increase the liquid discharge therethrough when the temperature difference is below a predetermined valve and decreasing the discharge when the temperature difference is greater than the predetermined value.

16. The refrigeration system of claim 12 further comprising:

(a) a pressure transducer connected to the reservoir for providing an electrical signal representative of the intermediate pressure;

(b) a first watt transducer connected to the first compressor for providing an electrical signal corresponding to the energy consumed by the first compressor;

(c) a second watt transducer connected to the third compressor for providing an electrical signal corresponding to the energy consumed by the third compressor;

(d) a control circuit connected to the pressure transducer, the first and second watt transducers, and the third compressor, said control circuit computing the combined energy consumed by the first and second compressors and in response thereto adjusting the speed of the second compressor so that the combined energy consumption is the least.

17. A control circuit for optimizing energy consumption in a two compression stage closed loop refrigeration system wherein a first compressor in the first stage compresses a gaseous refrigerant from a low pressure to an intermediate pressure while a second compressor in the second stage compresses the gaseous refrigerant from the intermediate to a high condenser pressure, comprising a control circuit which includes:

(a) a circuit electrically coupled to the first and second compressors for increasing and decreasing the capacity of one of the compressors;

(b) a circuit electrically connected to the compressors for measuring the combined energy consumed by the first and second compressors each time the speed of a compressor is charged;

(c) a comparator for comparing the combined energy consumption between the successive energy consumption measurements; and (d) a decision making circuit coupled to the comparator and the compressors for increasing and decreasing the capacity of one of the compressors as a function of the successive energy consumption measurements.

18. A method of achieving refrigeration in a closed loop refrigeration system having a reservoir for holding a liquid and gas refrigerant, said method comprising the steps of:

(a) discharging the liquid from the reservoir into a first evaporator for evaporating the liquid refrigerant into a gas;

(b) compressing the gas from the first evaporator and discharging the compressed gas into a condenser;

(c) condensing the gas in the condenser into a liquid refrigerant and discharging the liquid refrigerant into the reservoir;

(d) discharging some of the liquid refrigerant from the reservoir into a second evaporator for evaporating that liquid refrigerant into a gas; and (e) compressing the gas from the second evaporator and discharging that compressed gas into the liquid contained in the reservoir.

19. The method of claim 19 further comprising the step of compressing the gas from the reservoir and discharging that compressed gas into the condenser.

20. A refrigeration system having a reservoir for holding liquid and gas refrigerants, comprising:

(a) a first evaporator coupled to the reservoir for receiving the liquid refrigerant therefrom and evaporating that refrigerant to a gas;

(b) a condenser for condensing a gas refrigerant into a liquid refrigerant and discharging the liquid refrigerant into the reservoir;

(c) a first compressor coupled to the first evaporator for compressing gas from the first evaporator and discharging that compressed gas into the condenser;

(d) a second evaporator coupled to the reservoir for receiving the liquid refrigerant from the reservoir and evaporating that liquid refrigerant into a gas;

(e) a second compressor coupled to the second evaporator and the reservoir for compressing the gas from the second evaporator and discharging that compressed gas into the reservoir; and (f) a third compressor coupled to the reservoir for compressing the gas from the reservoir and discharging that compressed gas into the condenser.

21. A closed loop refrigeration system having a receiver for holding a refrigerant in liquid and gaseous states, comprising:

(a) a condenser coupled to the receiver for condensing compressed gas refrigerant into a liquid refrigerant and discharging the liquid refrigerant into the receiver;

(b) an evaporator coupled to the receiver for receiving the liquid refrigerant therefrom and evaporating that liquid refrigerant to a gas; and (c) a compressor coupled to the receiver and the evaporator for compressing the gas refrigerant from the evaporator and discharging that compressed gas into the liquid contained in the receiver.

* * * * *